(12) United States Patent
Chen et al.

(10) Patent No.: US 11,386,047 B2
(45) Date of Patent: Jul. 12, 2022

(54) VALIDATING STORAGE VIRTUALIZATION METADATA SUPPORTING REDIRECTION

(71) Applicant: EMC IP Holding Company LLC, Hopkinton, MA (US)

(72) Inventors: Xiangping Chen, Sherborn, MA (US); Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 326 days.

(21) Appl. No.: 16/819,841

(22) Filed: Mar. 16, 2020

(65) Prior Publication Data

US 2021/0286766 A1 Sep. 16, 2021

(51) Int. Cl.
*G06F 16/00* (2019.01)
*G06F 16/17* (2019.01)
(Continued)

(52) U.S. Cl.
CPC ...... *G06F 16/1734* (2019.01); *G06F 12/0246* (2013.01); *G06F 12/0873* (2013.01);
(Continued)

(58) Field of Classification Search
CPC .......... G06F 3/067; G06F 3/061; G06F 3/065; G06F 3/0665; G06F 3/0664; G06F 3/0608; G06F 3/0689; G06F 3/0647; G06F 3/0685; G06F 9/45558; G06F 2201/84; G06F 3/0617; G06F 3/0688; G06F 3/0619; G06F 3/0635; G06F 3/0673; G06F 16/1824; G06F 16/275; G06F 2009/45579; G06F 11/2094; G06F 12/0868; G06F 2201/815; G06F 3/0653; G06F 11/2097; G06F 2212/152; G06F 12/084; G06F 12/0864; G06F 12/1081; G06F 13/28; G06F 16/907; G06F 2212/2532; G06F 2212/314; G06F 2212/463; G06F 3/0605; G06F 3/0614; G06F 3/0631; G06F 9/4411; G06F 9/45533; G06F 3/0641; G06F 2201/82; G06F 3/0607; G06F 3/0659; G06F 11/1446;
(Continued)

(56) References Cited

U.S. PATENT DOCUMENTS 7,873,619 B1 * 1/2011 Faibish .................. G06F 16/13
707/823
8,549,518 B1 * 10/2013 Aron .................... G06F 9/45558
718/1
(Continued)

OTHER PUBLICATIONS

Choudhary, Gyanesh Kumar, et al.; "Techniques for Efficiently Performing Filesystem Reorganization Tasks for Different Filesystems," U.S. Appl. No. 15/394,601, filed Dec. 29, 2016.

*Primary Examiner* — Yicun Wu
(74) *Attorney, Agent, or Firm* — BainwoodHuang

(57) ABSTRACT

A technique for validating metadata includes creating log entries for virtualization structures pointed to by mapping pointers in a mapping tree and processing the log entries in multiple passes. A current pass validates a current level of redirection and creates new log entries to be processed during a next pass. The new log entries represent a next level of redirection, and as many next passes are processed in sequence as there are next levels of redirection.

20 Claims, 8 Drawing Sheets

(51) Int. Cl.
  *G06F 16/182* (2019.01)
  *G06F 16/174* (2019.01)
  *G06F 12/0873* (2016.01)
  *G06F 12/02* (2006.01)
(52) U.S. Cl.
  CPC ...... *G06F 16/1748* (2019.01); *G06F 16/1824* (2019.01); *G06F 2212/7207* (2013.01); *G06F 2212/7209* (2013.01)
(58) Field of Classification Search
  CPC ............ G06F 11/2069; G06F 11/2082; G06F 2201/805; G06F 3/064; G06F 16/128; G06F 2212/657; G06F 3/0613; G06F 3/0683; G06F 9/5077; G06F 16/1748; G06F 16/178; G06F 3/0604; G06F 3/0611; G06F 3/0632; G06F 3/0643; G06F 11/1662; G06F 11/2089; G06F 12/0246; G06F 3/0646; G06F 3/0667; G06F 11/108; G06F 11/1441; G06F 11/1448; G06F 11/1458; G06F 11/2015; G06F 11/2038; G06F 11/2048; G06F 11/2056; G06F 11/3006; G06F 12/08; G06F 12/10; G06F 12/1009; G06F 12/1036; G06F 12/109; G06F 16/1734; G06F 2212/7201; G06F 3/0638; G06F 3/0652; G06F 3/0661; G06F 11/1471; G06F 11/2076; G06F 12/0269; G06F 12/0824; G06F 12/0835; G06F 12/0871; G06F 12/0888; G06F 12/0891; G06F 12/0895; G06F 12/123; G06F 16/13; G06F 16/16; G06F 16/172; G06F 16/1727; G06F 16/1744; G06F 16/182; G06F 16/183; G06F 16/184; G06F 16/1844; G06F 16/188; G06F 16/2308; G06F 16/27; G06F 16/273; G06F 2009/45562; G06F 2009/45583; G06F 2009/45591; G06F 21/6218; G06F 21/6272; G06F 21/64; G06F 21/78; G06F 2212/1021; G06F 2212/466; G06F 2212/604; G06F 3/0649; G06F 3/0655; G06F 3/0676; G06F 3/0679; G06F 9/455; G06F 9/45545; G06F 9/4868; G06F 9/5027; G06F 11/1004; G06F 11/1076; G06F 11/1464; G06F 11/1469; G06F 11/1658; G06F 11/2028; G06F 11/2071; G06F 11/2074; G06F 12/0292; G06F 12/0873; G06F 16/10; G06F 16/11; G06F 16/119; G06F 16/162; G06F 16/164; G06F 16/17; G06F 16/185; G06F 16/235; G06F 16/2358; G06F 16/2379; G06F 16/24552; G06F 16/908; G06F 2009/45595; G06F 21/602; G06F 2201/855; G06F 2211/104; G06F 2212/1016; G06F 2212/1032; G06F 2212/151; G06F 2212/262; G06F 2212/651; G06F 2212/7207; G06F 2212/7209; G06F 3/0622; G06F 3/0626; G06F 3/0629; G06F 3/0644; G06F 3/0658; G06F 9/45541; G06F 9/466; G06F 9/485
  See application file for complete search history.

(56) References Cited

U.S. PATENT DOCUMENTS

| | | | |
|---|---|---|---|
| 9,146,921 B1 | 9/2015 | Vempati et al. | |
| 9,916,191 B1 | 3/2018 | Pan et al. | |
| 10,467,222 B1 | 11/2019 | Kuang et al. | |
| 11,119,668 B1* | 9/2021 | Keller | G06F 3/064 |
| 2002/0112113 A1* | 8/2002 | Karpoff | G06F 3/0665 |
| | | | 711/114 |
| 2006/0206603 A1* | 9/2006 | Rajan | H04L 67/1097 |
| | | | 709/223 |
| 2011/0082997 A1* | 4/2011 | Yochai | G06F 3/0605 |
| | | | 711/E12.001 |
| 2013/0091101 A1* | 4/2013 | Eslami Sarab | G06F 16/11 |
| | | | 707/690 |
| 2014/0310499 A1* | 10/2014 | Sundararaman | G06F 12/0269 |
| | | | 711/203 |

* cited by examiner

VALIDATING STORAGE VIRTUALIZATION METADATA SUPPORTING REDIRECTION

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems provide storage virtualization for supporting data services such as deduplication and compression. Storage virtualization provides a level of indirection between mapping trees in a storage system and underlying physical storage and allows data to be moved without adjusting the mapping trees.

Most modern storage systems include utilities for validating system metadata, including mapping trees and virtualization structures. For example, Unix and Linux-based systems provide FSCK (file system consistency check) and Windows-based systems provide CHKDSK (check disk). These utilities may be run whenever a user or administrator suspects data corruption. They typically run by scanning metadata structures and confirming their internal consistency, repairing errors when possible and marking as unavailable data whose metadata cannot be repaired. Consistency checking may extend to virtualization metadata in systems that support virtualization.

SUMMARY

Unfortunately, prior utilities for validating system metadata are limited in their capabilities. For example, prior utilities generally assume that virtualization structures provide only a single level of redirection, such as from a mapping tree to physical data. Certain use cases have arisen, however, in which it would be beneficial to allow multiple levels of redirection among virtualization structures. These include certain forms of deduplication (or "dedupe"), in which it may be useful for one virtualization structure (a "dedup source") to point to another virtualization structure (a "dedupe target"), rather than having to adjust mapping pointers in a mapping tree. Other examples include defragmentation ("defrag"), where space used for virtualization structures is consolidated by relocating a virtualization structure (a "defrag source") from a sparsely filled container to a more populated container, leaving behind a forwarding address to the destination (a "defrag target"). In some arrangements, virtualization structures may involve multiple redirections, such as both dedupe and defrag, creating chains of virtualization structures in the paths between the mapping tree and the physical data. Current utilities are ill-equipped for handing these complexities, however.

In contrast with such prior approaches, an improved technique for validating metadata includes creating log entries for virtualization structures pointed to by mapping pointers in a mapping tree and processing the log entries in multiple passes. A current pass validates a current level of redirection and creates new log entries to be processed during a next pass. The new log entries represent a next level of redirection, and as many next passes are processed in sequence as there are next levels of redirection.

Certain embodiments are directed to a method of validating storage virtualization metadata. The method includes, while scanning a plurality of mapping pointers in a metadata mapping tree of a storage system, creating a first set of log entries for VLBEs (virtual block elements) pointed to by the plurality of mapping pointers. During a first processing pass, the method includes (i) validating a set of metadata of the VLBEs of the first set of log entries and (ii) creating a second set of log entries, the second set of log entries created for VLBEs of the first set of log entries which are themselves sources or targets of redirection of other VLBEs of the storage system. During a second processing pass, the method further includes validating one or more metadata elements of the VLBEs of the second set of log entries.

Other embodiments are directed to a computerized apparatus constructed and arranged to perform a method of validating storage virtualization metadata, such as the method described above. Still other embodiments are directed to a computer program product. The computer program product stores instructions which, when executed on control circuitry of a computerized apparatus, cause the computerized apparatus to perform a method of validating storage virtualization metadata, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for validating metadata includes creating log entries for virtualization structures pointed to by mapping pointers in a mapping tree and processing the log entries in multiple passes. A current pass validates a current level of redirection and creates new log entries to be processed during a next pass. The new log entries represent a next level of redirection, and as many next passes are processed in sequence as there are next levels of redirection.

Figure 1:
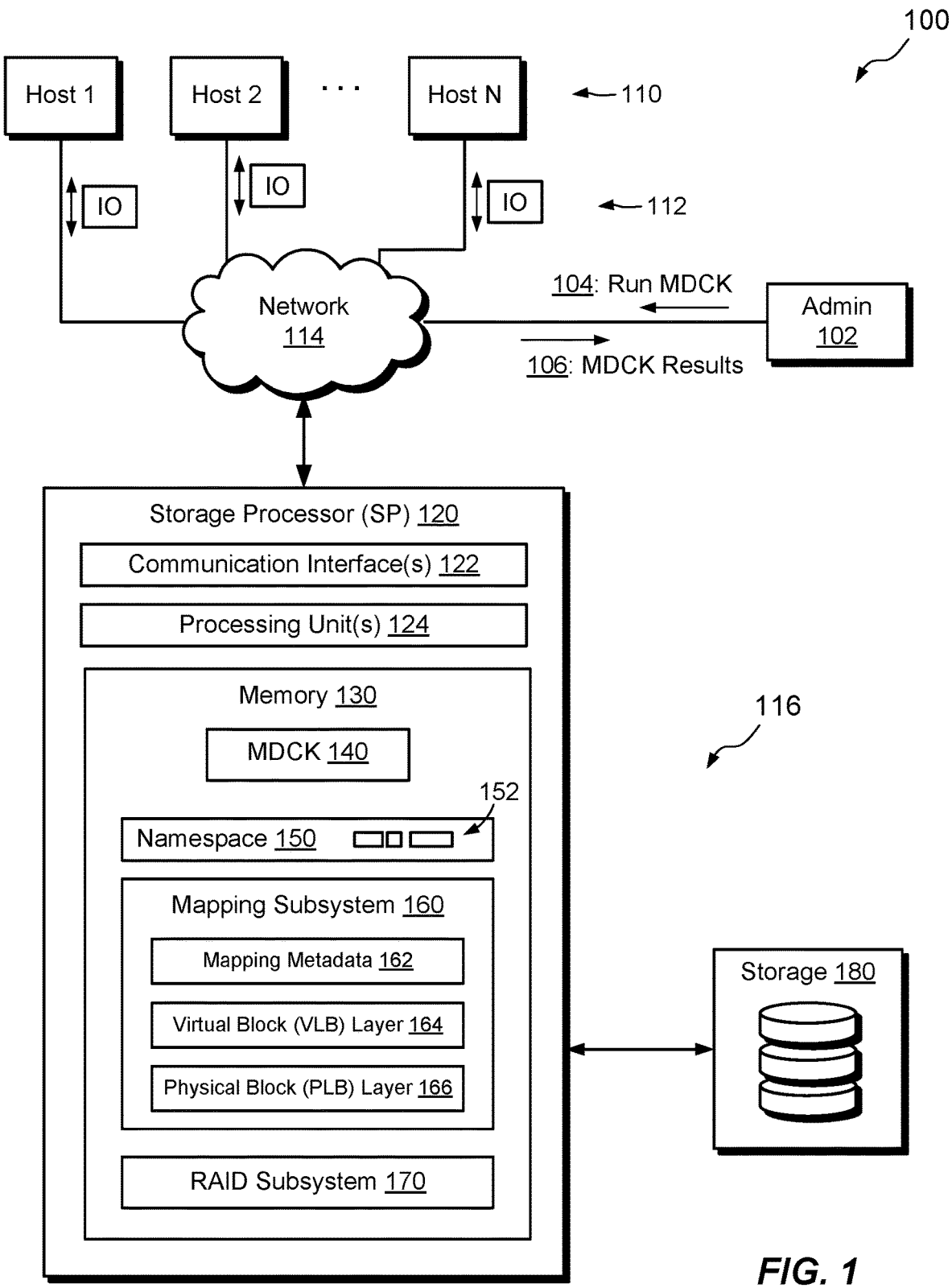
FIG. 1 is a block diagram of an example environment in which embodiments of the improved technique can be practiced.

FIG. 1 shows an example environment 100 in which embodiments of the improved technique can be practiced. Here, multiple hosts 110 and an administrative machine 102 access a data storage system 116 over a network 114. The data storage system 116 includes a storage processor, or "SP," 120 and storage 180, such as magnetic disk drives, electronic flash drives, and/or the like. The data storage system 116 may include multiple SPs. For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where separate hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units) and associated hardware. The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, an MDCK (metadata check) facility 140, such as a program, tool, or utility. In a non-limiting example, the MDCK facility 140 may be realized as a modified form of FSCK or CHKDSK.

The memory 130 further includes a namespace 150, a mapping subsystem 160, and a RAID subsystem 170. The namespace 150 is configured to organize logical addresses of host-accessible data objects 152, e.g., LUNs (Logical UNits), file systems, virtual machine disks, and the like, which may be accessed by hosts 110. The mapping subsystem 160 is configured to perform mapping from logical addresses in the namespace 150 to corresponding addresses in the RAID subsystem 170. The RAID subsystem 170 is arranged to organize storage 180 into RAID arrays 172, such as RAID groups and/or mapped RAID, and to associate RAID addresses with corresponding disk drive addresses in storage 180.

The mapping subsystem 160 includes mapping metadata 162, a virtual block (VLB) layer 164, and a physical block (PLB) layer 166. The mapping metadata 162 include arrays of pointers which may be arranged in a mapping tree, for mapping logical addresses in the namespace 150 to respective VLB elements in the VLB layer 164.

The VLB layer 164 is configured to support block virtualization. In an example, the VLB layer 164 includes individually addressable VLBs (virtual blocks), with each VLB including multiple VLB elements (VLBEs). Each VLBE may have a pointer to a compressed data block in the PLB layer 166 or to another VLBE (e.g., for supporting defragmentation and some forms of deduplication). Data blocks may be 4 kB, 8 kB, or any other suitably-sized increment.

The physical block (PLB) layer 166 stores representations of compressed data blocks. For example, the PLB layer 166 includes a large number of individual storage extents of uniform size, such as 2 MB. Each PLB extent is separately addressable, and particular compressed data blocks may be addressed within PLB extents based on offset and length. In an example, each PLB extent is formed as a single stripe of a RAID array of the RAID subsystem 170.

In example operation, hosts 110 issue I/O requests 112 to the data storage system 116. The I/O requests 112 include reads and/or writes directed to data objects 152. To accommodate writes, SP 120 allocates and configures mapping pointers in mapping metadata 162 and VLBEs in the VLB layer 166. As the data objects 152 evolve, they may be subjected to snapshots and deduplication. Some forms of deduplication may create redirections in the VLB layer 166. Also, VLBs may become fragmented over time, and SP 120 may trigger defragmentation operations, which may also create redirections in the VLB layer 166. Metadata paths from logical addresses of data objects 152 to corresponding data in the PLB layer 166 can thus become complex.

Over time, software errors may cause corruption in metadata paths. Such corruption can take numerous forms, such as broken pointers, erroneous reference counts, and erroneous metrics. Corruption may become apparent to an administrator 102, who may observe that certain user data is missing or improper. The administrator 102 may operate a separate computer or may access SP 120 directly. In an effort to address the corruption, the administrator 102 may run MDCK 140. In some examples, MDCK 140 may start on its own, e.g., after the SP 120 detects unexpected behavior.

As MDCK runs, it attempts to validate the mapping metadata 162 and the VLB layer 164. MDCK may correct errors where it can and generate output describing errors where it cannot, e.g., by identifying data that is deemed unavailable. MDCK then generates MDCK results 106 and returns the results to the administrator 102. As will be described, operation of MDCK 140 includes iterating over multiple levels of redirection in the VLB layer 164 and validating paths between the mapping metadata 162 and the PLB layer 166.

Figure 2:
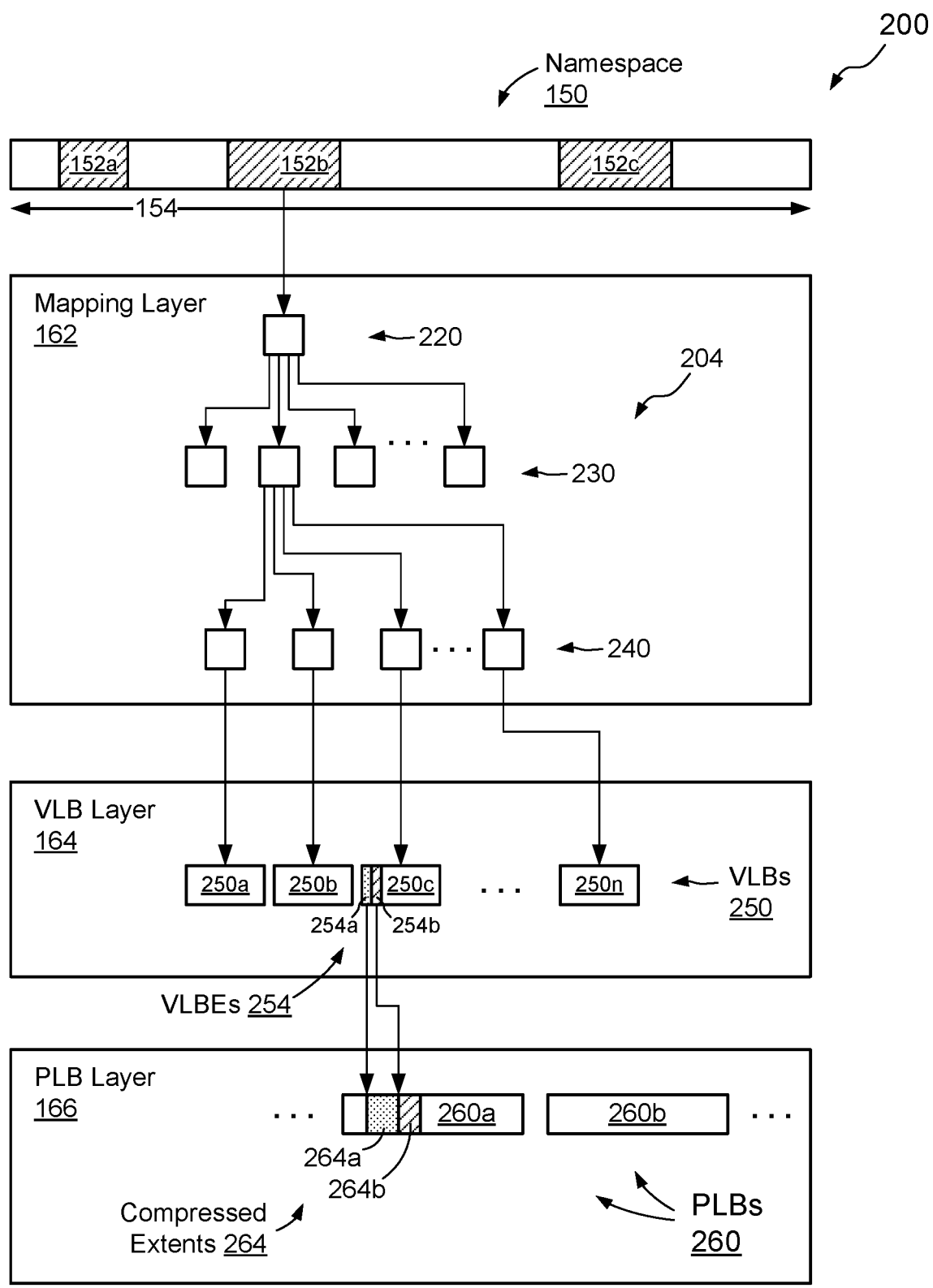
FIG. 2 shows example metadata structures for mapping logical addresses of data objects to corresponding physical storage locations.

FIG. 2 shows an example mapping arrangement 200 which may be used in connection with the environment of FIG. 1. Here, namespace 150 of FIG. 1 is seen to include a logical address space 154, which extends, for example, from zero to a very large number, such as 8 EB (Exabytes). Disposed within respective ranges of the logical address space 154 are data objects 152, such as LUNs, file systems, virtual machine disks, and the like. Data objects 152a, 152b, and 152c are specifically shown, but there may be hundreds, thousands, or millions of data objects 152.

FIG. 2 further shows a mapping tree 204, which maps the logical address range of data object 152b. Here, mapping tree 204 includes a top node 220, mid nodes 230, and leaf nodes 240. For example, each mapping node 220, 230, or 240 includes an array of pointers, such as 512 pointers, which point to nodes in the level below. For example, top node 220 includes up to 512 pointers to respective mid nodes 230, and each mid node 230 includes up to 512 pointers to respective leaf nodes 240. Each leaf node 240 includes up to 512 pointers to respective VLB elements (VLBEs) 254 in VLB layer 164. SP 120 may store top nodes 220, mid nodes 230, and leaf nodes 240 in metadata blocks, which may be stored separately from user data blocks, e.g., in a dedicated metadata tier (not shown).

VLBEs 254 are arranged in VLBs (virtual blocks) 250, such as VLBs 250a through 250n. In an example, each VLB 250 stores multiple VLBEs 254, such as 512 VLBEs. Two VLBEs 254a and 254b are specifically shown. VLBEs 254 may be pointed to by pointers in leaf nodes 240 and/or by pointers in other VLBE 254.

The PLB layer 166 below the VLB layer 164 includes representations of user data, typically in compressed form. As shown, PLB layer 166 includes multiple PLB extents 260, such as PLB extents 260a and 260b. Any number of such PLB extents 260 may be provided. As previously stated, each PLB extent may be formed as a single stripe of a RAID array of the RAID subsystem 170.

Each illustrated VLBE 254 points to respective PLB data 264. For example, VLBE 254a points to PLB data 264a and VLBE 254b points to PLB data 264b. The PLB data 264 have different lengths, reflecting the fact that different user data is compressible to different degrees.

Figure 3:
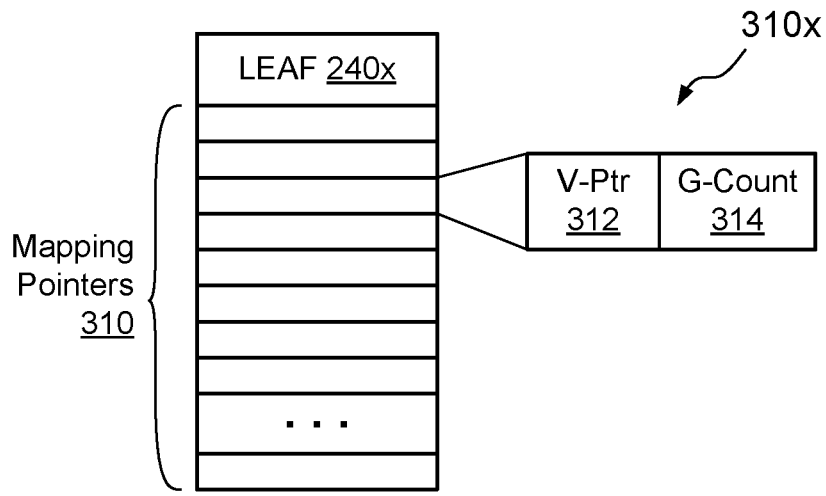
FIG. 3 shows an example arrangement of a leaf structure of FIG. 2 and of pointers within the leaf structure.

FIG. 3 shows an example leaf 240x in greater detail. Here, leaf 240x includes an array of mapping pointers 310 (e.g., 512 mapping pointers). As shown by way of example, mapping pointer 310x includes a virtual pointer (V-Ptr) 312 and a generation count (G-Count) 314. The virtual pointer 312 identifies a particular VLBE 254 in the VLB layer 164, and the generation count 314 identifies a particular generation of the pointed-to VLBE 254. SP 120 stores generation counts 314 in the mapping pointers 310 at the time of mapping-pointers creation, based on a corresponding generation count associated with the VLBE pointed to by the mapping pointer 310. Thus, the generation count 314 of a mapping pointer 310 matches the generation count of the associated VLBE at the time the mapping pointer 310 is created.

It is observed that VLBEs 254 may be allocated for different user data at different times. For example, a VLBE originally allocated for mapping a first block of user data may later be allocated for mapping a second block of user data. Thus, different generation counts 314 may exist for the same VLBE, indicating different user data being mapped at different times. This arrangement means that the virtual pointer 312 alone is insufficient to uniquely identify a metadata path; rather, the tuple of virtual pointer 312 and generation count 314 serves this purpose.

Figure 4:
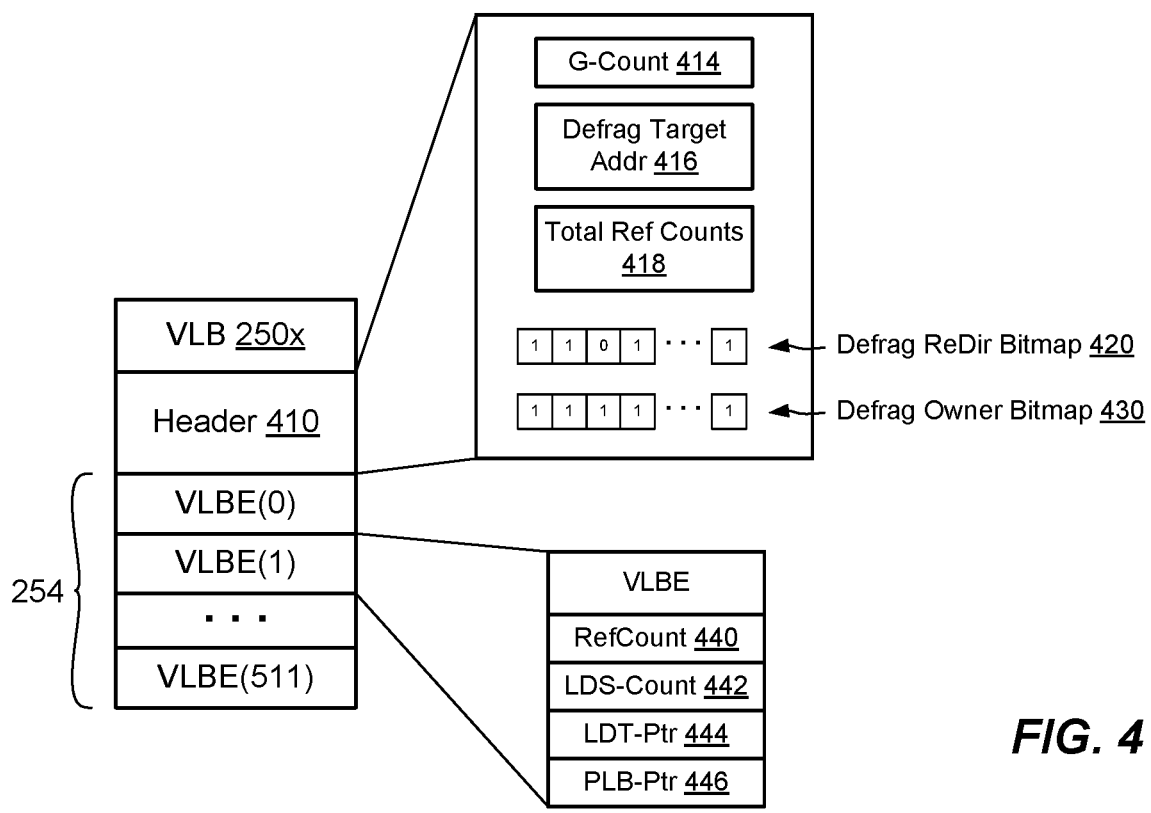
FIG. 4 shows an example arrangement of a VLB (virtual block) in a virtual block layer of FIG. 2, including an example arrangement of a VLBE (virtual block element) within the illustrated VLB.

FIG. 4 shows an example VLB 250 in greater detail. Here, VLB 250x includes a header 410 and multiple VLBEs 254, such as 512 VLBEs, VLBE(0) through VLBE(511). As shown, the header 410 includes a generation count (G-Count) 414, which in this example applies to all VLBEs 254 in VLB 250x. This arrangement reflects a design choice to perform defragmentation at VLB-level granularity rather than at VLBE-level granularity. Alternatively, generation counts may be provided in VLBEs 254, e.g., if defragmentation is performed at VLBE-level granularity. The generation count 414 may be incremented each time the VLB 250x is relocated as part of defragmentation.

The header 410 is further seen to include a defrag target address 416. The defrag target address 416 identifies a location of a defrag target, i.e., another VLB 250 in the VLB layer 164 to which the VLBEs 254 of VLB 250x have been relocated. This element may be omitted or null if VLB250x is not a defrag source.

Also shown in the header 410 is total reference counts 418, which represents a sum of all reference counts 440 (see below) of all VLBEs 254 in VLB 250x. MDCK may refer to this header element during validation to confirm that reference counts of all VLBEs 254 in VLB 250x sum to the indicated total.

The header 410 is further seen to include one or more bitmaps 420 and/or 430. Typically, bitmap 420 is present if VLB 250x is a defrag source and bitmap 430 is present if VLB 250x is a defrag target. Both bitmaps may be used in implementations where the VLB 250x is both a defrag source and a defrag target (e.g., if multiple defrag operations are allowed). In an example, each bitmap 420 or 430 includes a separate bit for each VLBE in the VLB 250x, and the bits are arranged in order based on VLBE index. In the case of bitmap 420, each bit indicates whether the respective VLBE has been redirected to a defrag target (i.e., the one indicated in defrag target address 416). In the case of bitmap 430, each bit indicates whether the respective VLBE is an owner, meaning that it is being used and should not be overwritten during defragmentation from another VLBE to this one. One should appreciate that the header 410 may contain other fields or different fields than those described. The example shown is intended merely to be illustrative.

FIG. 4 further shows example metadata of a VLBE 254. In an example, such metadata includes the following:

RefCount 440. A count of mapping pointers 310 in the mapping metadata 162 that point to this VLBE. A count greater than one may be attributed to certain forms of deduplication, e.g., inline deduplication, and/or to snapshots.

LDS-Count 442. A count of all Late Deduplication Sources that point to this VLBE. For example, late deduplication is accomplished by pointing the VLBE of a dedupe candidate block to the VLBE of a dedupe target block. A count greater than one means that multiple other VLBEs are using this VLBE for mapping a dedupe target.

LDT-Ptr 444. A pointer to a Late Deduplication Target used by this VLBE, which acts as a late deduplication source. Although a dedupe target can have multiple dedupe sources pointing to it, a dedupe source can only point to one dedupe target.

PLB-Ptr 446. A pointer to underlying data in the PLB layer 166.

One should appreciate that a VLBE 254 may contain other fields or different fields from those described. The example shown is intended merely to be illustrative.

Figures 5A, 5B:
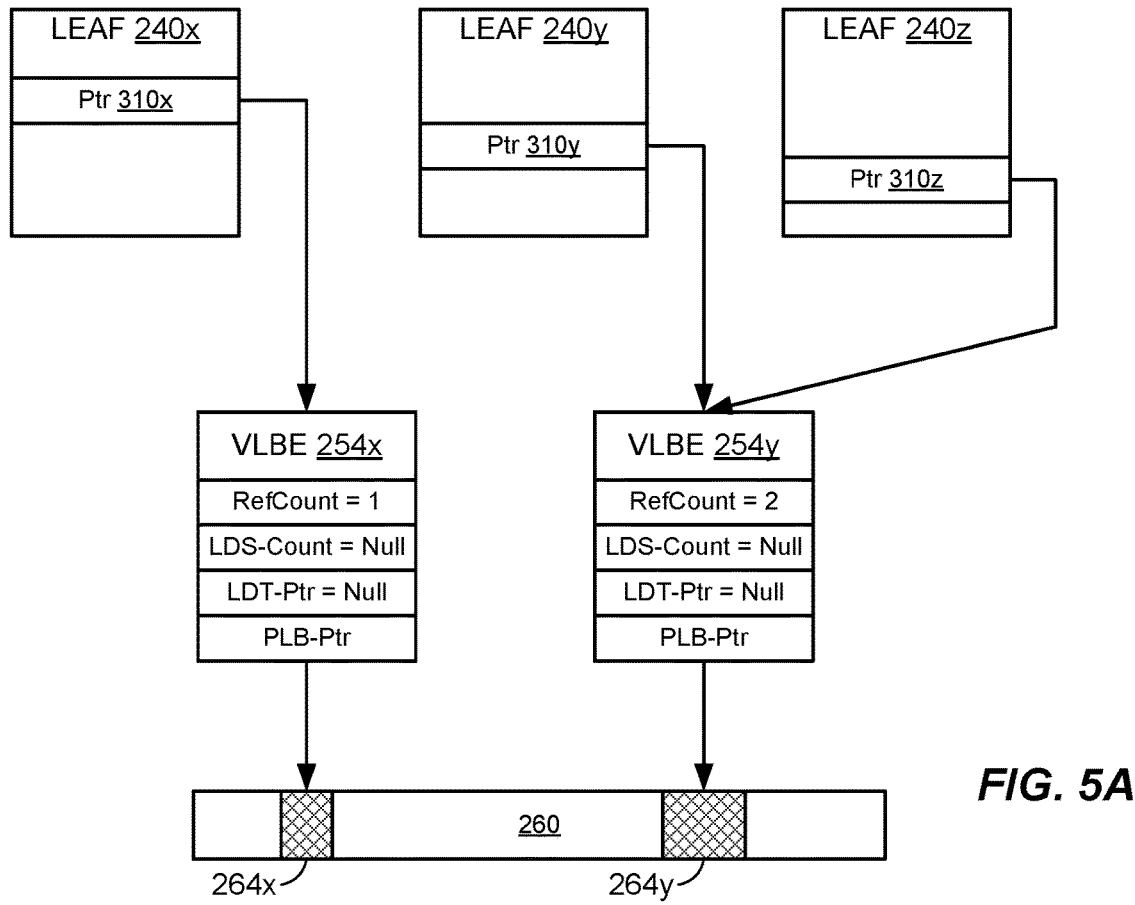
FIGS. 5A and 5B show an example arrangement of VLBEs having a single level of redirection (FIG. 5A) and example log entries that may be created in a journal (FIG. 5B) for validating the arrangement of FIG. 5A during a single pass.

FIGS. 5A and 5B show a first example for validating virtualization metadata. This first example depicts a case involving only one level of redirection. As shown in FIG. 5A, mapping pointers 310x, 310y, and 310z in respective leaves 240x, 240y, and 240z of the mapping tree 204 point to VLBEs 254 in the VLB layer 164. Mapping pointer 310x points to VLBE 254x, and mapping pointers 310y and 310z both point to VLBE 254y. The RefCount 440 of VLBE 254x is 1, and the RefCount 440 of VLBE 254y is 2. As there is no late deduplication in this example, LDS-Count 442 and LDT-Ptr 444 are both null in both VLBEs 254x and 254y. PLB-Ptr 446 of VLBE 254x points to compressed block 264x in PLB 260 of PLB layer 166, and PLB-Ptr 446 of VLBE 254y points to compressed block 264y.

FIG. 5B shows example log entries 512 in a journal 510, which may be used in validating the virtualization metadata in the arrangement of FIG. 5A. Here, MDCK 140 creates the log entries 512 by scanning the mapping pointers 310 in mapping tree 204 (FIG. 2) and creating an entry 512 for each unique mapping pointer 310, e.g., as uniquely identified by the tuple of V-Ptr 312 and G-Count 314. In some examples, log entries 512 may be limited to a subset of all mapping pointers 310 in the tree 204, such as only those designated as "source" mapping pointers, e.g., in a source-copy mapping scheme. In this case, the scanning of the tree 204 results in the creation of two unique entries, 512a and 512b.

While scanning the leaves 240 of the tree 204, MDCK counts the number of times each unique mapping pointer is found and places that number in the respective log entry 512, under U-Ptr-Count 520. MDCK thus assigns log entry 512a a U-Ptr-Count of 1 and assigns log entry 512b a U-Ptr-Count of 2. Notably, these values are obtained by scanning the leaves 240, not by checking the RefCounts 440.

In an example, when creating the log entries 512 MDCK checks whether the VLBEs of the respective entries are involved in any additional levels of redirection. MDCK may accomplish this, for example, by performing any of the following acts when processing a current entry 512:

Checking the header 410 of the VLB 250 that contains the VLBE recorded in the current entry to determine whether the generation count 414 in the header 410 matches the generation count 314 of the mapping pointer recorded in the current entry. A mismatch indicates that the VLBE is a defrag source and thus that there is a redirection to a defrag target. A match, as assumed here, indicates no redirection resulting from the VLBE of the current entry being a defrag source.

Checking the LDS-Count 442 of the VLBE recorded in the current entry. If the LDS-Count contains a count of 1 or more, the VLBE is a dedupe target and is thus involved in a redirection based on dedupe. If the LDS-Count is null or zero, as indicated here, the VLBE recorded in the current entry is not a dedupe target.

Checking the LDT-Ptr 444 of the VLBE recorded in the current entry. If the LDT-Ptr is a valid pointer to another VLBE, then the VLBE of the current entry is a dedupe source. But if the LDT-Ptr does not contain a valid pointer, as indicated here, the VLBE of the current entry is not a dedupe source.

In some examples, headers 410 of the VLBs 250 separately store a "type" field (not shown), which indicates whether the VLB 250 is a "native" VLB, a "defrag source," or a "defrag target." In such cases, MDCK may further check the type field to determine whether there is redirection based on defrag.

As the journal 510 of FIG. 5B indicates only one level of redirection, i.e., from mapping pointers 310 to PLB data 264, the journal 510 may be completely processed in a single pass, i.e., "This" pass. This first (and only) pass may include verifying the reference counts 440 in the VLBEs 254x and 254y. For example, MDCK compares the unique pointer counts 420 in log entries 512a and 512b with corresponding reference counts 440 of VLBEs 254x and 254y. In this case, the two sets of counts match, indicating no errors. Additional consistency checking may be performed at this time, based on available information.

One should appreciate that the example shown in FIGS. 5A and 5B is highly simplified for illustration. Still, only a single pass would be needed for any number of log entries 512, as long as none of the log entries 512 involved greater than one level of redirection.

Figures 6A, 6B:
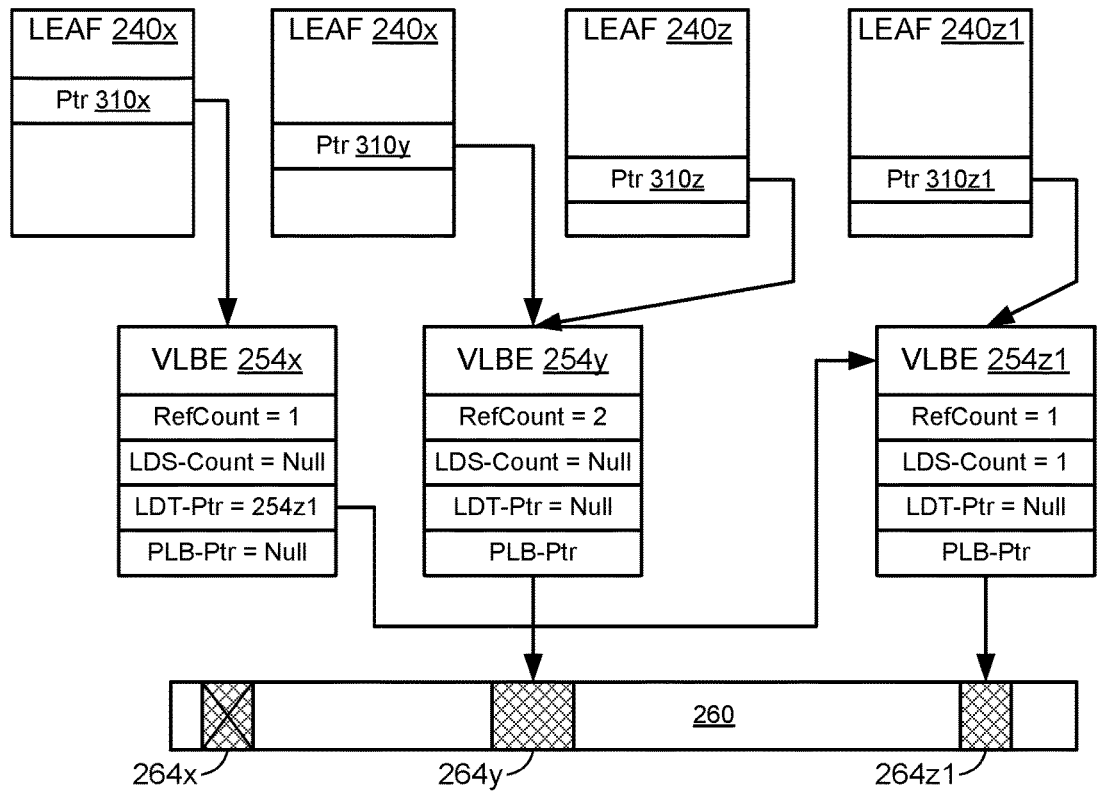
FIGS. 6A and 6B show an example arrangement of VLBEs having two levels of redirection (FIG. 6A) and example log entries that may be created in a journal (FIG. 6B) for validating the arrangement of FIG. 6A during a first pass and a second pass.

FIGS. 6A and 6B show a second example for validating virtualization metadata. This second example depicts a case involving two levels of redirection. The arrangement here is similar to that shown in FIG. 5A, except that there is an additional mapping pointer 310z1 in an additional leaf 240z1. The additional mapping pointer 310z1 points to an additional VBLE 254z1. The additional VBLE 254z1 may be located in any VLB 250 in the VLB layer 164. In the example, a late deduplication has been performed, with VLB 254x no longer pointing to data 264x but instead pointing to VLBE 254z1, which points to data 264z1. Thus, mapping pointer 310x resolves to data 264z1, as does the mapping pointer 310z1. The space previously occupied by data 264x has been freed. The LDT-Ptr of VLBE 254x now points to VLBE 254z1, and the LDS-Count of VLBE 254z1 is set to 1, as there is a total of 1 dedupe source pointing to VLBE 254z1. The RefCount 440 of VLBE 254z1 is also set to 1, indicating that only one mapping pointer 310 in the tree 204 (Ptr 310z1) points to VLBE 254z1.

As shown in FIG. 6B, MDCK performs two processing passes for validating the two levels of redirection. While scanning the mapping pointers 310, MDCK finds three unique mapping pointers 310 and creates respective entries 512a, 512b, and 512c. A first processing pass ("This") then proceeds similarly that that described in connection with FIG. 5B. The exception is that the checking of VLBE 254*x* in entry 512*a* reveals that VLBE 254*x* is a dedupe source, which points to a dedupe target via VLBE 254*z*1. To manage this second level of redirection, which was discovered when processing entry 512*a* during the first pass, MDCK adds a new log entry 512*d* to record the dedupe relationship. For example, the entry 512*d* records the late dedupe source (LDS) 610 as VLBE 254*x* and records the late dedupe target (LDT) 620 as VLBE 254*z*1, based on the metadata stored in VLBE 254*x*. MDCK marks the log entry 512*d* for processing during the next pass ("Next"). MDCK also maintains a count (DDS-Count) 630 of the number of VLBEs in the VLB layer 164 that point to VLBE 254*z*1 as a dedupe target. Notably, MDCK obtains DDS-Count 630 by scanning the VLB layer 164.

When the first pass has completed, MDCK checks whether any entries 512 in the journal 510 still await processing. MDCK discovers one entry, 512*d*, and proceeds to initiate second pass processing, during which it validates log entry 512*d*. For example, MDCK compares the accumulated DDS-Count 630 in the entry 512*d* with the LDS-Count 442 stored in VLBE 254*z*1. As they are both 1, the two values match and there is no error. Had the two values been different, MDCK might have repaired the error by changing the LDS-Count of VBLE 254*z*1 to match the value of DDS-Count 630 obtained by scanning the VLB layer 164. Additional verifications may be performed at this time.

Although the example of FIGS. 6A and 6B include only a single entry for the second ("Next") pass, the journal 510 may include any number of such entries. Any entries added during the first pass for recording a next level of redirection may all be processed during the second pass. In addition, although this example shows the second level of redirection as being based on late deduplication, it could also be based on defragmentation. Indeed, log entries 512 created during the first pass for processing during the second pass may include a combination of entries arising from late deduplication and from defragmentation.

Figures 7A, 7B, 7C:
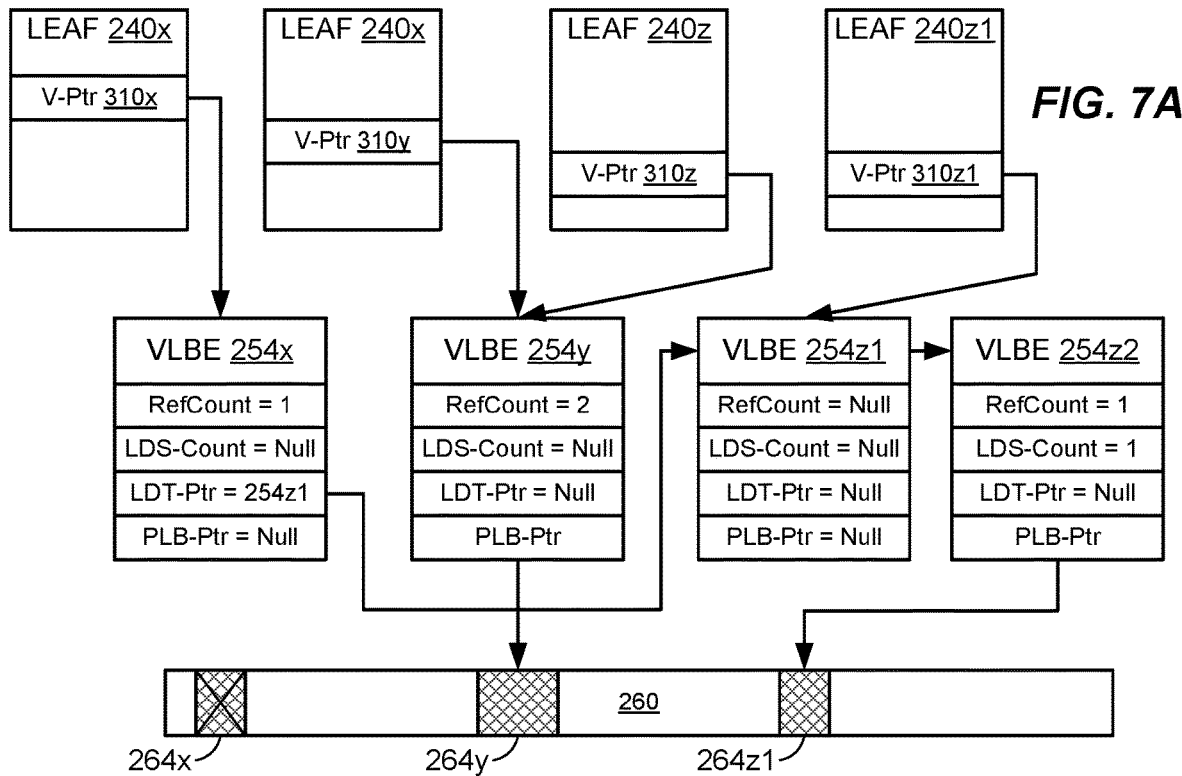
FIGS. 7A-7C show an example arrangement of VLBEs having three levels of redirection (FIG. 7A), example log entries that may be created in a journal (FIG. 7B) for validating the arrangement of FIG. 7A during a first pass, and example log entries that may be created in a journal (FIG. 7C) for validating the arrangement of FIG. 7A during a second pass and a third pass.

FIGS. 7A-7C show a third example for validating virtualization metadata. This third example depicts a case involving three levels of redirection. The arrangement here is similar to the one shown in FIG. 6A, except that VLBE 254*z*1 has been forwarded as a result of defragmentation to VLBE 254*z*2. In an example, all VLBEs in the VLB 250 that contains VLBE 254*z*2 (others not shown) would be forwarded together, with defragmentation performed at VLB-level granularity rather than at VLBE-level granularity. The generation count 414 of the VLB containing VLBE 254*z*1 is incremented by 1, and the generation count 414 of the VLB containing VLBE 254*z*2 is set to 0. Defrag target VLBE 254*z*2 inherits the RefCount 440, LDS-Count 442, LDT-Ptr 444, and PLB-Ptr 446 of the defrag source VBLE 254*z*1, which values may be set to null in VBLE 254*z*1. Defragmentation may free VBLE 254*z*1, allowing it to be used elsewhere. Metadata structures in the header 410 of the VLB 250 that contains VLBE 254*z*1 may remain in place, enabling access to VBLE 254*z*2 via that header 410, without having to access VLBE 254*z*1 directly.

As shown in FIG. 7B, MDCK proceeds as in FIG. 6B, creating log entries 512*a*, 512*b*, and 512*c* when scanning mapping pointers 310. During the first processing pass ("This"), log entries 512*a*, 512*b*, and 512*c* are processed as described in connection with FIG. 6B. Upon processing entry 512*a*, a late dedup target is found, which is recorded in log entry 512*d*, as was done previously. Log entry 512*c* is marked for processing during the "Next" pass. Similar validations may be performed to those described in connection with FIG. 6B.

FIG. 7C shows an example arrangement of the journal 510 during the second pass. The completed first-pass entries 512*a*, 512*b*, and 512*c* have been removed or otherwise invalidated from the journal 510. The second pass has become the current pass ("This"). Here, in the course of validating entry 512*d*, MDCK discovers that VLBE 254*z*1, which is a dedupe target, is also a defrag source. For example, MDCK checks the header 410 of the VLB that contains VLBE 254*z*1 and discovers that a defrag target is identified, e.g., in field 416 (FIG. 4). By checking the bitmap 420 MDCK can further confirm that this particular element, VLBE 254*z*1, has been relocated to the indicated defrag target. With this information in hand, MDCK creates a new log entry 512*e*, which records the redirection from VLBE 254*z*1 to VLBE 254*z*2, e.g., by populating entry fields for defrag source 710 and defrag target 720. MDCK may also maintain a count DF-Target-Count 730, of the number of mapping pointers 310 that point to the defrag source, VLBE 254*z*1.

MDCK then initiates a third processing pass, during which it validates entry 512*e*. Any other third-level redirect entries may also be processed at this time. Validating entry 512*e* may involve comparing the DF-Target-Count 730 with the RefCount 440 of VLBE 254*z*2. In the case of a match, no error is found. In the case of a mismatch, MDCK may assign the RefCount 440 of VLBE 254*z*2 to the value of DF-Target Count 730. Other validations may be performed at this time.

Should the VLB layer 164 include additional levels of redirection, additional log entries may be created and additional processing passes performed. Although some embodiments may limit the number of redirections allowed, other embodiments may be unrestricted in this regard, permitting any number of redirections based on dedupe and/or defrag.

Figure 8:
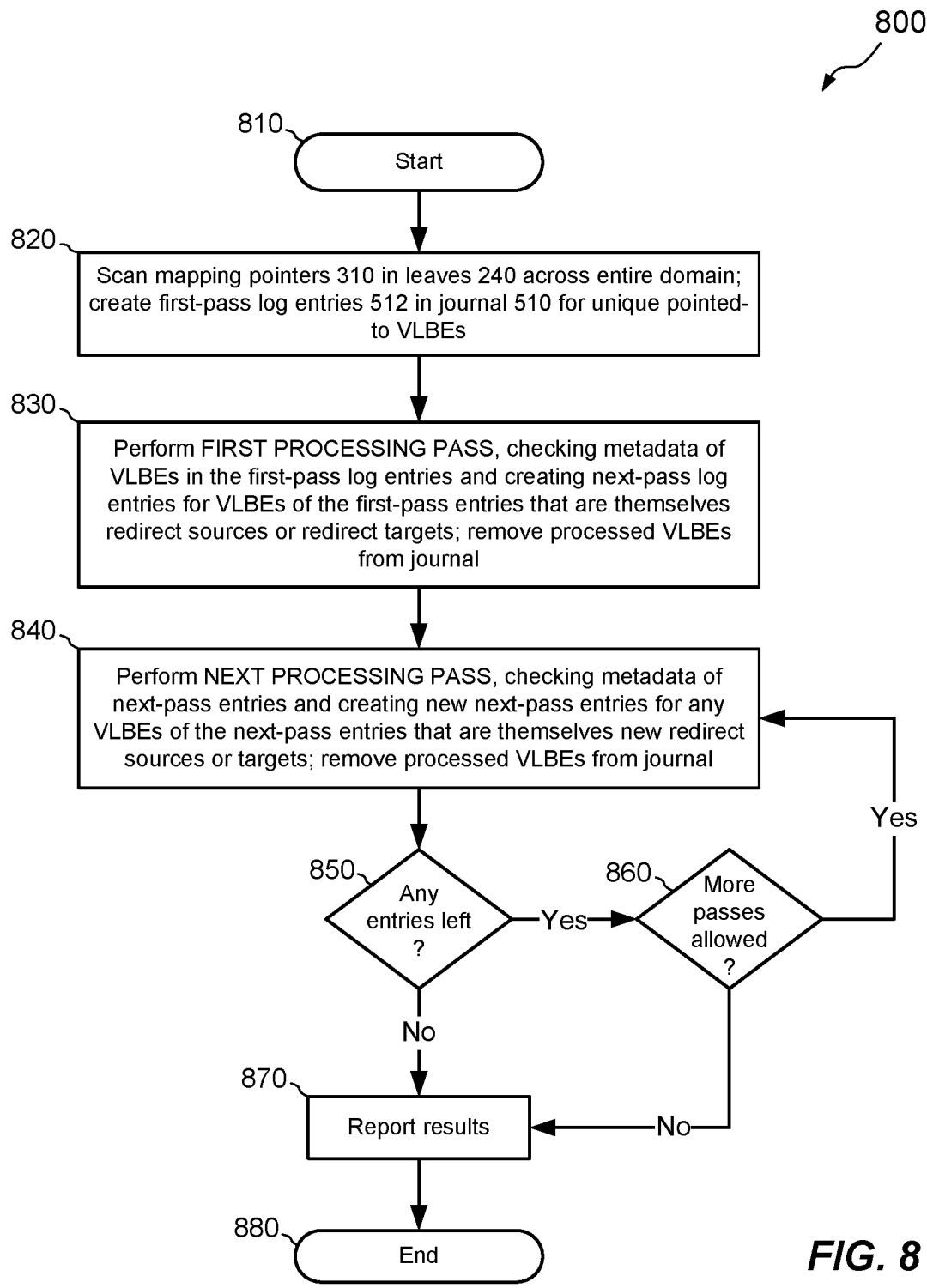
FIGS. 8 and 9 are flowcharts showing example methods of validating metadata in the environment of FIG. 1.
Figure 9:
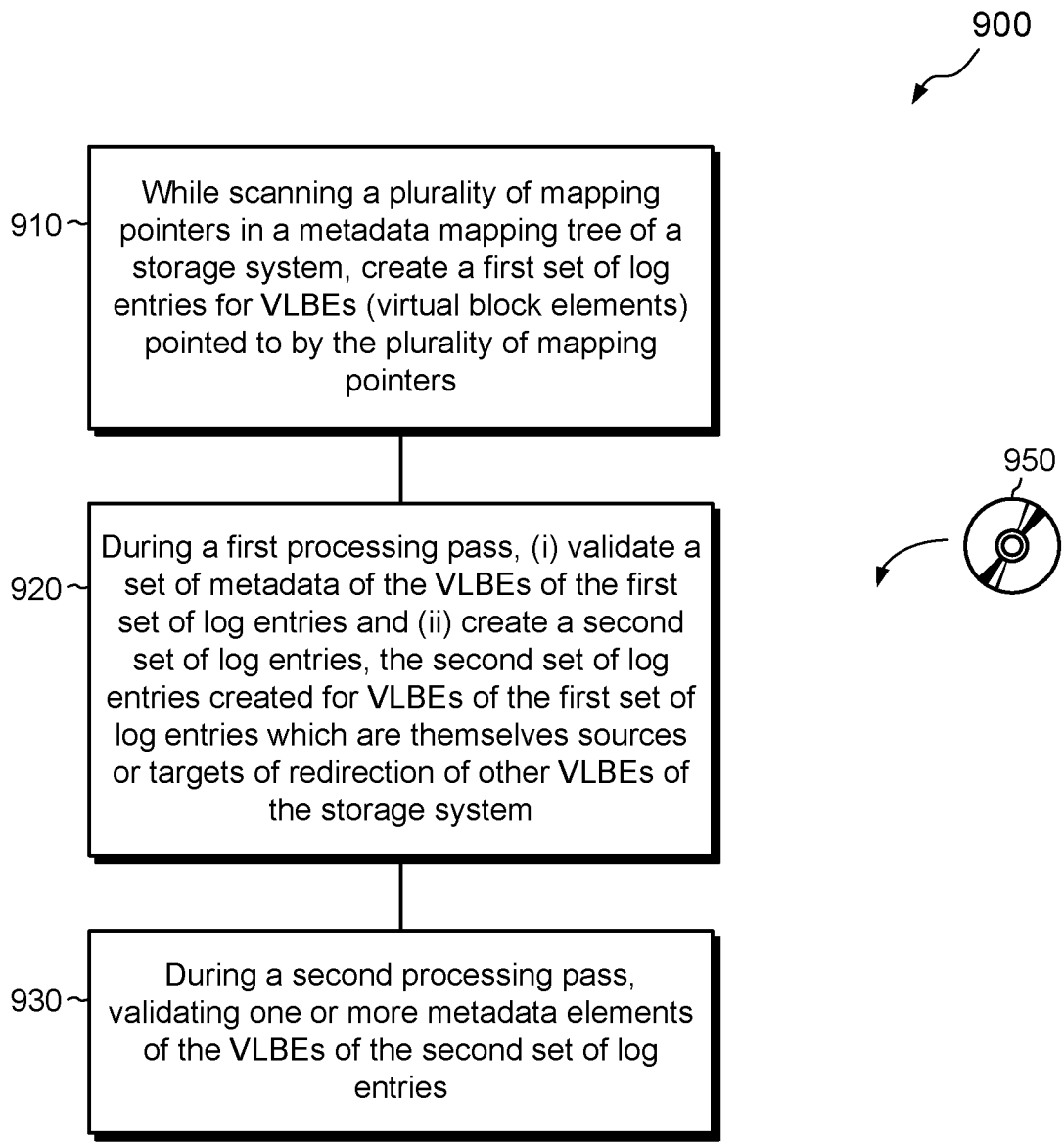

FIGS. 8 and 9 show example method 800 and 900 that may be carried out in connection with the environment 100. The methods 800 and 900 are typically performed, for example, by the software constructs described in connection with FIG. 1, which reside in the memory 130 of the storage processor 120 and are run by the set of processing units 124. The various acts of methods 800 and 900 may be ordered in any suitable way. Accordingly, embodiments may be constructed in which acts are performed in orders different from those illustrated, which may include performing some acts simultaneously.

In FIG. 8, the method 800 of validating storage virtualization metadata is shown. The method 800 begins at 810, whereupon MDCK runs and gets to a point at which it begins validating the VLB layer 164. MDCK may itself be initiated, for example, in response to a request 104 from administrator 102.

At 820, MDCK scans mapping pointers 310 in leaves 420 across an entire domain, such as across a particular pool, across some other structure, or across the entire storage system. As MDCK runs, it creates first-pass log entries 512 (e.g., 512*a*, 512*b*, and 512*c* of FIG. 7B) in journal 510 for unique mapping pointers 310. The log entries 512 identify, for example, respective VLBEs 254 pointed to by the mapping pointers 310 and respective generation counts 314. The log entries 512 may also provide accumulated counts of mapping pointers to the VLBEs 254 represented in the log entries 512.

At 830, MDCK performs a first processing pass, which may include checking metadata of VLBEs in the first-pass log entries and creating next-pass log entries for VLBEs of the first-pass log entries which are themselves redirect sources or redirect targets. For example, MDCK may detect, during the first pass, that a VLBE in a log entry 512 is involved in a second-level of redirection, e.g., as a dedupe source, a dedupe target, a defrag source, or a defrag target. MDCK may then create a new next-pass log entry 512 (e.g., 512*d*) for each second-level redirection. First-pass entries 512 may be removed from the journal 510 during the first pass once they are validated.

At 840, MDCK performs a next processing pass, such as a second processing pass. This processing pass may involve checking metadata of the next-pass entries (now current-pass entries) and creating new next-pass entries for any VLBEs of the now-current-pass entries that are themselves new redirect sources or targets. Entries processed during this pass may be removed from the journal 510.

At 850, MDCK determines whether any unprocessed entries 512 remain in the journal 510. If so, and if additional passes are permitted (at 860; e.g., some embodiments may limit the number of passes), operation returns to 840, whereupon the acts described in connection with the second pass are performed in connection with a third pass. Operation may proceed in this manner indefinitely, processing each successive level of redirection in a successive processing pass, until no entries remain unprocessed or until a maximum allowed number of passes is reached.

Once processing is complete, operation proceeds to 870, where results are reported, and then to 880, whereupon the validation of storage virtualization metadata ends.

In FIG. 9, the method 900 of validating storage virtualization metadata is shown. At 910, while scanning a plurality of mapping pointers 310 in a metadata mapping tree 204 of a storage system 116, a first set of log entries 512 is created for VLBEs (virtual block elements) 254 pointed to by the plurality of mapping pointers 310.

At 920, during a first processing pass, the method 900 (*i*) validates a set of metadata of the VLBEs 254 of the first set of log entries 512, such as reference counts or other metadata, and (ii) creates a second set of log entries 512. The second set of log entries 512 is created for VLBEs 254 of the first set of log entries 512 which are themselves sources or targets of redirection of other VLBEs 254 of the storage system 116, such as sources or targets of deduplication and/or defragmentation.

At 930, during a second processing pass, the method 900 validates one or more metadata elements of the VLBEs 254 of the second set of log entries, such as other reference counts, pointers, and the like.

Having described certain embodiments, numerous alternative embodiments or variations can be made. For example, although log entries 512 have been shown and described as residing within a single journal 510, this is merely an example. Other embodiments may arrange log entries 512 in other ways, such as by providing different journals for different levels of redirection. Further, the particular elements tracked by the log entries 512 are intended to be illustrative rather than limiting. Indeed, log entries 512 may store a wide range of information to promote metadata validation and consistency checking. The particular tracking structures shown in the header 410 and VLBEs 254 are also intended as illustrative examples, as there are many ways of tracking similar information.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further, although embodiments have been shown and described in connection with a particular storage architecture, the storage architecture shown is merely an example, as similar principles may be applied to a wide range of architectures.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of validating storage virtualization metadata, the method comprising:
   while scanning a plurality of mapping pointers in a metadata mapping tree of a storage system, creating a first set of log entries for VLBEs (virtual block elements) pointed to by the plurality of mapping pointers;
   during a first processing pass, (i) validating a set of metadata of the VLBEs of the first set of log entries and (ii) creating a second set of log entries, the second set of log entries created for VLBEs of the first set of log entries which are themselves sources or targets of redirection of other VLBEs of the storage system; and during a second processing pass, validating one or more metadata elements of the VLBEs of the second set of log entries.

2. The method of claim 1, further comprising, during the second processing pass, creating a third set of log entries, the third set of log entries created for VLBEs of the second set of log entries which are themselves redirect sources or redirect targets.

3. The method of claim 2, further comprising, during a third processing pass, validating one or more metadata elements of the VLBEs of the third set of log entries.

4. The method of claim 2, further comprising performing an additional processing pass for each additional level of redirection among VLBs of the storage system.

5. The method of claim 1, wherein the first set of log entries includes log entries created for VLBEs that are sources of defragmentation, and wherein validating said one or more metadata elements during the second pass includes confirming that a defragmentation source points to a defragmentation target.

6. The method of claim 1, wherein the first set of log entries includes log entries created for VLBEs that are targets of defragmentation, and wherein validating said one or more metadata elements during the second pass includes confirming that a defragmentation target is pointed to by a defragmentation source.

7. The method of claim 1, wherein the first set of log entries includes log entries created for VLBEs that are sources of deduplication, and wherein validating said one or more metadata elements during the second pass includes confirming that a deduplication source points to a deduplication target.

8. The method of claim 1, wherein the first set of log entries includes log entries created for VLBEs that are targets of deduplication, and wherein validating said one or more metadata elements during the second pass includes confirming that a deduplication target is pointed to by a deduplication source.

9. The method of claim 1, wherein validating said one or more metadata elements during the second pass includes confirming that reference counts stored in association with the VLBEs of the second set of log entries match numbers of VLBEs that point to the VLBEs of the second set of log entries.

10. A computerized apparatus, comprising control circuitry that includes a set of processing units coupled to memory, the control circuitry constructed and arranged to:

while scanning a plurality of mapping pointers in a metadata mapping tree of a storage system, create a first set of log entries for VLBEs (virtual block elements) pointed to by the plurality of mapping pointers;

during a first processing pass, (i) validate a set of metadata of the VLBEs of the first set of log entries and (ii) create a second set of log entries, the second set of log entries created for VLBEs of the first set of log entries which are themselves sources or targets of redirection of other VLBEs of the storage system; and during a second processing pass, validate one or more metadata elements of the VLBEs of the second set of log entries.

11. The computerized apparatus of claim 10, wherein the control circuitry is further constructed and arranged to, during the second processing pass, create a third set of log entries, the third set of log entries created for VLBEs of the second set of log entries which are themselves redirect sources or redirect targets.

12. A computer program product including a set of non-transitory, computer-readable media having instructions which, when executed by control circuitry of a computerized apparatus, cause the computerized apparatus to perform a method of validating storage virtualization metadata, the method comprising:

while scanning a plurality of mapping pointers in a metadata mapping tree of a storage system, creating a first set of log entries for VLBEs (virtual block elements) pointed to by the plurality of mapping pointers;

during a first processing pass, (i) validating a set of metadata of the VLBEs of the first set of log entries and (ii) creating a second set of log entries, the second set of log entries created for VLBEs of the first set of log entries which are themselves sources or targets of redirection of other VLBEs of the storage system; and during a second processing pass, validating one or more metadata elements of the VLBEs of the second set of log entries.

13. The computer program product of claim 12, wherein the method further comprises, during the second processing pass, creating a third set of log entries, the third set of log entries created for VLBEs of the second set of log entries which are themselves redirect sources or redirect targets.

14. The computer program product of claim 13, wherein the method further comprises, during a third processing pass, validating one or more metadata elements of the VLBEs of the third set of log entries.

15. The computer program product of claim 13, further comprising performing an additional processing pass for each additional level of redirection among VLBs of the storage system.

16. The computer program product of claim 12, wherein the first set of log entries includes log entries created for VLBEs that are sources of defragmentation, and wherein validating said one or more metadata elements during the second pass includes confirming that a defragmentation source points to a defragmentation target.

17. The computer program product of claim 12, wherein the first set of log entries includes log entries created for VLBEs that are targets of defragmentation, and wherein validating said one or more metadata elements during the second pass includes confirming that a defragmentation target is pointed to by a defragmentation source.

18. The computer program product of claim 12, wherein the first set of log entries includes log entries created for VLBEs that are sources of deduplication, and wherein validating said one or more metadata elements during the second pass includes confirming that a deduplication source points to a deduplication target.

19. The computer program product of claim 12, wherein the first set of log entries includes log entries created for VLBEs that are targets of deduplication, and wherein validating said one or more metadata elements during the second pass includes confirming that a deduplication target is pointed to by a deduplication source.

20. The computer program product of claim 12, wherein validating said one or more metadata elements during the second pass includes confirming that reference counts stored in association with the VLBEs of the second set of log entries match numbers of VLBEs that point to the VLBEs of the second set of log entries.

* * * * *